United States Patent
Katrak et al.

(10) Patent No.: US 7,877,179 B2
(45) Date of Patent: Jan. 25, 2011

(54) MECHANICAL AND ELECTRICAL LOCKING COORDINATION SECURITY STRATEGY FOR AN ACTIVE FRONT STEER SYSTEM

(75) Inventors: Kerfegar K. Katrak, Fenton, MI (US); Robert R. Bolio, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1170 days.

(21) Appl. No.: 11/530,976

(22) Filed: Sep. 12, 2006

(65) Prior Publication Data

US 2008/0065294 A1 Mar. 13, 2008

(51) Int. Cl.
*A01B 69/00* (2006.01)
(52) U.S. Cl. .......................... 701/43; 180/402
(58) Field of Classification Search ............. 701/41–43; 180/402, 403
See application file for complete search history.

(56) References Cited

U.S. PATENT DOCUMENTS

| | | | |
|---|---|---|---|
| 4,972,133 A * | 11/1990 | Hirota et al. ............. | 318/646 |
| 5,303,156 A * | 4/1994 | Matsuoka et al. ......... | 701/43 |
| 2007/0225885 A1* | 9/2007 | Hara et al. .................. | 701/43 |

FOREIGN PATENT DOCUMENTS

| | | |
|---|---|---|
| DE | 3825280 A1 | 2/1990 |
| DE | 19638912 A1 | 3/1998 |
| DE | 19908357 A1 | 8/2000 |
| EP | 1384647 A1 | 1/2004 |

* cited by examiner

*Primary Examiner*—Dalena Tran
(74) *Attorney, Agent, or Firm*—Ingrassia Fisher & Lorenz, P.C.

(57) ABSTRACT

A system as described herein relates generally to automotive active front steering control systems having a main processor and a redundant sub-processor. The system provides a way of controlling the electrical and mechanical locking of an actuator motor in a variable gear ratio active front steering system. The method enables the sub-processor to electrically lock the active front steer actuator motor via the main processor to reduce mechanical wear or damage to the variable gear ratio system if the main processor is unable to electrically lock the actuator motor before it mechanically locks the actuator motor. The system also provides an error detecting technique that is robust to false failures and allows the active front steering system to safely transition into a fail safe mode if an error occurs.

14 Claims, 5 Drawing Sheets

|  | Inp. U | Inp. V | Inp. W | PRESENT VALUES | PROPOSED OVERALL VALUE | | | | | | | | | PROPOSED UPPER NIBBLE VALUES | PROPOSED LOWER NIBBLE VALUES |
|---|---|---|---|---|---|---|---|---|---|---|---|---|---|---|---|
| | L | L | L | 0 | 10 | 0 | 0 | 0 | 0 | 1 | 0 | 1 | 0 | 0 | 10 |
| | H | H | H | 7 | 245 | 1 | 1 | 1 | 1 | 0 | 1 | 0 | 1 | 15 | 5 |

FIG. 2

|  | Inp. U | Inp. V | Inp. W | PRESENT VALUES | PROPOSED OVERALL VALUE | | | | | | | | | PROPOSED UPPER NIBBLE VALUES | PROPOSED LOWER NIBBLE VALUES |
|---|---|---|---|---|---|---|---|---|---|---|---|---|---|---|---|
| | L | L | H | 1 | 54 | 0 | 0 | 1 | 1 | 0 | 1 | 1 | 0 | 3 | 6 |
| | L | H | H | 2 | 89 | 0 | 1 | 0 | 1 | 1 | 0 | 0 | 1 | 5 | 9 |
| | L | H | L | 3 | 106 | 0 | 1 | 1 | 0 | 1 | 0 | 1 | 0 | 6 | 10 |
| | H | H | L | 4 | 156 | 1 | 0 | 0 | 1 | 1 | 1 | 0 | 0 | 9 | 12 |
| | H | L | L | 5 | 163 | 1 | 0 | 1 | 0 | 0 | 0 | 1 | 1 | 10 | 3 |
| | H | L | H | 6 | 197 | 1 | 1 | 0 | 0 | 0 | 1 | 0 | 1 | 12 | 5 |

FIG. 3

| Inp. U | Inp. V | Inp. W | PRESENT VALUES | PROPOSED OVERALL VALUE | Binary | | | | | | | | PROPOSED UPPER NIBBLE VALUES | PROPOSED LOWER NIBBLE VALUES | HAMMING DISTANCE |
|---|---|---|---|---|---|---|---|---|---|---|---|---|---|---|---|
| L | L | H | 1 | 54 | 0 | 0 | 1 | 1 | 0 | 1 | 1 | 0 | 3 | 6 | 6 |
| L | H | H | 2 | 89 | 0 | 1 | 0 | 1 | 1 | 0 | 0 | 1 | 5 | 9 | |
| L | H | H | 2 | 89 | 0 | 1 | 0 | 1 | 1 | 0 | 0 | 1 | 5 | 9 | 4 |
| L | H | L | 3 | 106 | 0 | 1 | 1 | 0 | 1 | 0 | 1 | 0 | 6 | 10 | |
| H | H | L | 3 | 104 | 0 | 1 | 1 | 0 | 1 | 0 | 0 | 0 | 6 | 8 | 6 |
| H | L | L | 4 | 156 | 1 | 0 | 0 | 1 | 1 | 1 | 0 | 0 | 9 | 12 | |
| H | L | L | 4 | 156 | 1 | 0 | 0 | 1 | 1 | 1 | 0 | 0 | 9 | 12 | 6 |
| H | L | H | 5 | 163 | 1 | 0 | 1 | 0 | 0 | 0 | 1 | 1 | 10 | 3 | |
| H | L | H | 5 | 163 | 1 | 0 | 1 | 0 | 0 | 0 | 1 | 1 | 10 | 3 | 4 |
| H | H | H | 6 | 197 | 1 | 1 | 0 | 0 | 0 | 1 | 0 | 1 | 12 | 5 | |
| H | H | H | 6 | 197 | 1 | 1 | 0 | 0 | 0 | 1 | 0 | 1 | 12 | 5 | 6 |
| L | H | H | 1 | 54 | 0 | 0 | 1 | 1 | 0 | 1 | 1 | 0 | 3 | 6 | |
| L | L | L | 0 | 10 | 0 | 0 | 0 | 0 | 1 | 0 | 1 | 0 | 0 | 10 | 8 |
| H | H | L | 7 | 245 | 1 | 1 | 1 | 1 | 0 | 1 | 0 | 1 | 15 | 5 | |

MECHANICAL AND ELECTRICAL LOCKING COORDINATION SECURITY STRATEGY FOR AN ACTIVE FRONT STEER SYSTEM

TECHNICAL FIELD

The present invention generally relates to active front steer control systems, and more particularly relates to safety measures for automotive steering and control systems in active front steering systems.

BACKGROUND OF THE INVENTION

Vehicle steering is generally controlled by a driver hand wheel that directs the angle of the vehicle road wheels used for steering. The movements of the driver hand wheel are transmitted to the vehicle road wheels by mechanical linkages and/or electronic components. The vehicle road wheels that change angle are generally located in the front of the vehicle in a system referred to as "front steering". The angle of the road wheels is referred to as road wheel angle.

Active front steering (AFS) is a term referring to the use of electronic components to actively control or assist the steering of a vehicle so as to enhance steering performance beyond that possible by only direct mechanical linkages. There are many possible ways to enhance steering performance; for example, steering can be adapted to the weather conditions, to the behavior and habits of the driver, provide orderly stopping if the driver loses control, enhance the driver hand wheel control by changing steering characteristics, or provide driver control in the event of a steering mechanism malfunction.

In an AFS system, variable gear ratio (VGR) steering is a method for adding and subtracting steering angle to or from the target road wheel angle implied by the driver's hand wheel input. This can be accomplished by mechanical, electrical components, and combination devices like actuator motors. It is desirable to insure that the VGR system is fail-safe, operates in a safe manner, and does not vary greatly from its intended operational parameters.

In an AFS system, the intended angle at the hand wheel and the actual angle at the front steering wheels are monitored by sensors; generally Hall effect sensors. A Hall effect sensor is an electronic device that varies its output voltage in response to changes in magnetic field density. When a magnetic field is perpendicular to the surface of a sheet of conductive material, an electric field is created across the surface. For a given magnetic field, the distance from the magnet to the sheet can be determined. Using groups of sensors, the relative position of a known magnet can be determined. By measuring relative position, Hall effect sensors can be used to time the speed and position of wheels and control shafts. Due to their magnetic nature Hall effect sensors are non-contacting so they don't have wear from contact over time. Because they do not require direct contact, Hall effect sensors are generally not affected by dust, dirt, mud, water, and oil so they are ideal for the dirty environment of automotive applications. A Hall effect sensor may have circuitry that allows the device to act in a high/low voltage switch mode. Other binary devices that allow the sensors to act in a high/low voltage switch mode may also be used to time the speed and position of the wheels and the control shafts, including, without limitation, transistors. Hall effect sensors are generally located in the spiral cable at the magnet plate between the wave motion generator and the flexible gear in an AFS system.

In a typical AFS system, there are three sensors that are used to measure the angle of the steering actuator. Each sensor is either in a "high" state (for example, corresponding to a 12 volt output) or a "low" state (for example, corresponding to a 0 volt output). The functional status of the three sensors is determined by a diagnostic system. The diagnostic system may include measuring the output angle indicated by the sensor in response to predetermined actuator motor angle positions.

An AFS system may have errors or malfunctions in the actuator angle sensors or in the AFS system's processors. Processor errors may occur due to electrical or other faults. The processor may continue to have some functionality after certain types of errors or faults have been detected. At the extreme, some processor errors may result in a significant loss of functionality. For this reason, some AFS systems utilize two redundant processors as a fail-safe measure.

At present, if there is an error in the processors, implementing the diagnostic algorithm, it is not coordinated between the processors. If there is a processor error, then there could be false detection of an AFS system error (alpha error) or non-detection of a defective AFS system (beta error). Any system or method to detect processor errors should also not introduce its own additional alpha and beta errors.

When an error is detected in a particular sensor by an AFS diagnostic system processor, the actuator motor may be mechanically locked to prevent potential damage to the variable gear steering and other AFS system components including an actuator motor lock holder. Mechanical locking involves setting a fixed steering ratio with a physical device. At present, both the main and the sub-processor can mechanically lock the actuator motor by removing power to the actuator motor, and the actuator motor may be electrically phase-locked before mechanically locking. At present, the AFS system has the ability to electrically lock the AFS actuator motor only via the main processor. Moreover, if an error occurs in the operation of an AFS system control processor, the sub-processor is only capable of locking the actuators mechanically and not electrically.

It is desirable to design a new system and method to allow the AFS system sub-processor to lock the actuator motor electrically if an error occurs. Additionally, it is desirable to have an AFS system diagnostic technique that is robust to false failures and allows the AFS system to safely go to a fail-safe mode if an error occurs. Other desirable features and characteristics of embodiments of the present invention will become apparent from the subsequent detailed description and the appended claims, taken in conjunction with the accompanying drawings and the foregoing technical field and background.

SUMMARY OF THE INVENTION

A method according to an example embodiment of this invention provides a way for an AFS system sub-processor to electronically lock the AFS actuator motor via a main processor when an error occurs. The method also includes a robust diagnostic technique that reduces errors due to false failures. The method may be utilized to detect a sensor error or a processor error in an AFS system for a vehicle having single or multiple angle sensors and single or multiple actuators, and configured to electronically and mechanically lock an actuator motor when an error is detected. The method according to an example embodiment of this invention provides a vehicle user with a fail-safe and robust AFS system.

The method monitors the AFS actuator angle position sensors over time to detect an expected sequence of encoded sensor state patterns. If the expected sequence of the encoded sensor patterns is not detected by a main or a sub-processor, an error is signaled and the AFS actuator motor is locked.

The method may be performed by a first or main processor and a second or sub-processor. In example embodiments, each processor maintains an independent counter to monitor sequence status and coordinate error status with the other processor. Each processor may independently monitor the AFS system for errors and may generate an error indicator using the counter if an AFS system error is detected and may transmit the error indicator to the other process. All or a subset of the AFS actuator angle position sensors are monitored over time by each processor. Each processor detects the sensor state patterns, converts them into a sequence of encoded sensor state patterns and compares them to an expected sequence of sensor state patterns. On detection of an erroneous deviation from the expected sequence of sensor state patterns, the detecting processor increments its counter to generate an error indicator and transmits the error indicator to a receiving processor.

The receiving processor may be the first processor. The first processor may electrically lock the AFS actuator in response to the error indicator. The second processor may be the sub-processor; the second processor may electrically lock the AFS actuator via the first processor if for example, the decoder of the first processor is not functioning properly. The AFS actuator may also be electrically and/or mechanically locked by the first processor. Alternatively, the receiving processor may be the second processor. The first processor may malfunction and fail to lock the AFS actuator in which case the AFS actuator may be mechanically locked by the second processor.

Using an embodiment of the new method allows an AFS system sub-processor to electronically lock the AFS actuator motor via the AFS system main processor when an error occurs by providing an error coordination methodology between the sub-processor and the main processor. The method includes a robust diagnostic technique that reduces errors due to false failures by converting sensor state patterns into a sequence of robustly encoded sensor state patterns.

Other desirable features and characteristics of embodiments of the present invention will become apparent from the subsequent detailed description and the appended claims, taken in conjunction with the accompanying drawings and the foregoing technical field and background.

DESCRIPTION OF THE DRAWINGS

The present invention will hereinafter be described in conjunction with the following drawing figures, wherein like numerals denote like elements.

FIG. 2 is a diagram that contains sensor state patterns and encoded sensor state patterns corresponding to sensor errors according to an example embodiment of this invention;

FIG. 3 is a diagram that contains sensor state patterns and expected encoded sensor state patterns corresponding to a processor's normal operation according to an example embodiment of this invention;

FIG. 4 is a diagram that contains hamming distances corresponding to expected encoded sensor state patterns according to an example embodiment of this invention;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of this invention may be described herein in terms of functional and/or logical block components and various processing steps. It should be appreciated that such block components may be realized by any number of hardware, software, and/or firmware components configured to perform the specified functions. For example, an embodiment of this invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of this invention.

For the sake of brevity, conventional techniques related to signal processing, data transmission, variable gear ratio systems, active steering, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of this invention.

Figure 1:
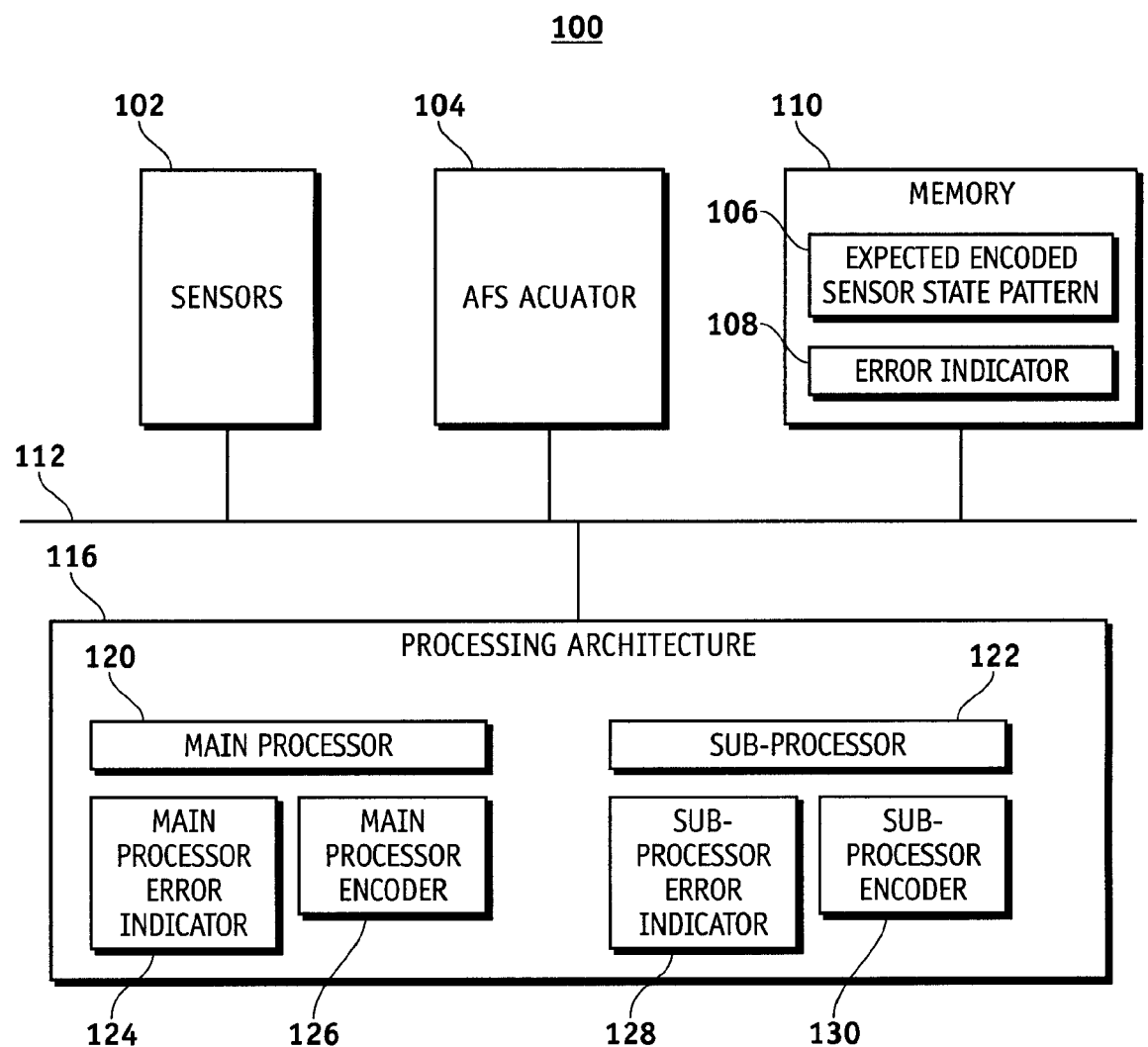
FIG. 1 is a schematic representation of an AFS system according to an embodiment of this invention.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of this invention (assuming that the functionality of the system is not adversely affected). According to one technical dictionary, "coupling" is defined as the association of two or more circuits or systems in such a way that power or signal information may be transferred from one to another. This definition may also apply herein.

A method according to an example embodiment of this invention monitors the AFS actuator angle position sensors over time to detect an expected sequence of encoded sensor state patterns. If the expected sequence of encoded sensor patterns is not detected by a main or a sub-processor, an error is signaled and the AFS actuator motor is locked. The techniques described herein enable both the main processor and the sub-processor to coordinate the electrical and mechanical locking of the actuator while not being sensitive to single bit, nibble byte, "stuck at low" and "stuck at high" faults.

FIG. 1 is a schematic representation of an AFS system 100 that is suitably configured to perform failure diagnostic monitoring processes according to embodiments of this invention. The various block modules depicted in FIG. 1 may be realized in any number of physical components or modules located throughout an AFS system 100 and/or the vehicle. A practical AFS system 100 may include a number of electrical control units (ECUs), computer systems, and components other than those shown in FIG. 1. Conventional subsystems, features, and aspects of AFS system 100 will not be described in detail herein.

An example AFS system 100 may generally include a plurality of sensors 102, an AFS actuator 104, a suitable amount of memory 110, and a processing architecture 116. In the illustrated implementation, processing architecture 116 includes a main processor 120, a sub-processor 122, a main processor error indicator 124, a main processor encoder 126, a sub-processor error indicator 128, and a sub-processor encoder 130. These elements may communicate with one another as needed via a communication bus 112 or other suitable interconnection architecture or arrangement. In this embodiment, the processing architecture 116 and memory 110 support the AFS system failure state diagnostic monitoring process described in more detail below.

The memory 110 is a data storage area that is formatted to support the operation of AFS system 100. Memory 110 is coupled to the sensors 102 and has sufficient capacity to accommodate the AFS diagnostic monitoring process. Memory 110 is configured to store, for example, expected encoded sensor state patterns 106 generated by the processors 120 and 122 at the various sensor positions, and the error indicator 108. Memory 110 may be realized as RAM memory, flash memory, registers, a hard disk, a removable disk, or any other forms of storage medium known in the art.

The processing architecture 116 is generally a logical processing device that is configured to perform the operations described in detail herein. In practice, processing architecture 116 may be implemented or performed by a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

In the example embodiment, the processing architecture 116 is configured to monitor the AFS failure diagnostic process. Processing architecture 116 is configured to detect processor errors and sensor errors, and to coordinate the errors between the processors to lock the AFS actuator 104 accordingly. Each processor 120 and 122 is suitably configured to detect an error if an expected sequence of encoded sensor patterns (which will be described in detail below) is not detected, or if a sensor permanent low or high state is detected. The processors coordinate the error between them and lock the AFS actuator 104 electronically or mechanically depending on the failure conditions (as described in detail below).

According to an example embodiment of this invention, when one of the sensors 102 is faulty, it typically results in a permanent state indication. In this example, a sensor error results in a permanent high state indication or a permanent low state indication for the failed sensor. In other words, regardless of the sensor position, the failed sensor will always indicate the same constant output state. The output state will be a constant high or low depending upon the failure mode, the failure cause, and the failure conditions.

In the example embodiment, the sensors 102 are configured to generate output for a plurality of sensor positions, and each of the sensors 102 is configured to indicate a plurality of output states. According to one example embodiment of this invention, sensors 102 include three Hall effect sensors (identified as sensors U, V, and W), and each sensor of the sensors 102 generates angle sensor state data corresponding to its angle position. In this example, each of the sensors 102 indicates a high (H or "1") value or a low (L or "0") value at each angle position, and information or data indicative of the H or L state is processed by AFS system 100 in the manner explained below. Thus, for a particular sensor position, the current states for sensors 102 represent a state pattern. For example, a state pattern at a first sensor position may be (U=L, V=L, W=L), a state pattern at a fifth sensor position may be (U=L, V=L, W=H), etc. For three sensors there are eight possible combinations of state patterns. In practice, the state patterns may be predetermined or assigned such that, in normal operation, the detected state patterns are predictable by AFS system 100.

Each processor 102 and 122 may assign an order to each of the possible combinations of the state patterns corresponding to each angle sensor position. For example, (U=L, V=L, W=L) may be assigned an order value of zero, (U=L, V=L, W=H) may be assigned an order value of one, and so on for the other state patterns. These values are also referred to as sequence counter values. According to the example embodiment of this invention, there are eight sequence counter values (0,1,2,3,4,5,6,7) corresponding to the eight possible sensor state patterns for three binary output sensors. Complete assignment for the sequence counters according to an example embodiment of this invention will be explained in detail below.

For detecting errors due to sensor malfunction, a counter for each processor sequences through possible actuator angle sensor positions to test if the positions are properly represented by the sensor state patterns corresponding to the states of the three sensors. The processors assign an actuator angle position to the AFS actuator 104, and the AFS actuator 104 assumes the actuator angle position. The sensors 102 then send the sensor state pattern corresponding to the current actuator angle position (for example, U=L, V=L, W=L) to the processors 120 and 122, and the processors 120 and 122 verify that the sensor state pattern corresponds correctly to an expected sensor state pattern for the current actuator angle position. Otherwise, one or both of the processors 120 and 122 indicates a sensor error for the sensors 102 or an error in a position of the AFS actuator 104 angle.

In order to detect an error in the processors, a non-systematic hamming code is assigned to the three U, V, W sensor triples. This works as follows: For each U, V, W sensor triple (for example, U=1, V=0, W=0), an 8 bit number is assigned (for example, 10100011 in binary which is equal to 163 in decimal). The 8 bit number is chosen so that the numbers assigned to each sensor triple differs from every other assign 8 bit number by at least 4 bits. The above sequences are coded in 8 bits instead of less so they are immune to a single bit, a nibble byte or word stuck at low and stuck at high error. FIG. 3 shows a table of the assignments for this example embodiment.

This encoding allows processor errors to be detected while also being robust to transient errors that are not long term system failures. This is because a transient error will only effect a small number of bits for a limited time, whereas a processor failure will result in the sequence not being generated correctly with many bit errors over an extended time. There may be errors in one or two diagnostic time loops (in this example, a diagnostic time loop may be about 6 ms) that might have been caused due to glitches or loose wires. For a general implementation, the error detection sequence is repeated in 6 diagnostic time loops and these transient errors may recover before the diagnostic time loop expires. The AFS then returns to normal functionality.

How detected errors are handled will be described next. In one embodiment, when either processor's detection mechanism is failing the other processor will detect the error. When an error occurs, the diagnostic time loop completes on both processors and set an error indicator (In this example, each processor may repeat monitoring the sequence of encoded sensor state patterns for occurrence of errors in one or more diagnostic time loops). If the main processor 120 detects this error first, it will electrically lock the AFS actuator 104 when this numerical value (for example, 10 or 245 depending on the sensor failure) is inserted in the sequence. Both processors may detect the same patterns simultaneously and if there is an error then they send an error indicator to each other within the diagnostic time loop.

As mentioned previously, patterns of logic high or low for the three sensors 102 (U,V,W) can be ordered in a numerical sequence (0,1,2,3,4,5,6,7) for all eight possible high and low combination patterns for the three sensors 102. Thus for example, if all three sensor states indicate logic high, the numerical value is designated as 7 (sensor permanent high state). On the other hand, if all three sensor states indicate logic low, the numerical value is designated as 0 (sensor permanent low state). Positions one through six indicate whether or not the processors are functioning properly based on a given memory fault model to be given in detail below. In normal operation the processors 120 and 122 read the sensor state patterns one through six, then repeat the read sequence in a continuous loop.

A sensor permanent state for all three actuator angle sensors (U, V, and W) at logic low (LLL state) indicates that one of the sensors 102 is stuck low. Similarly, a sensor permanent state for all three actuator angle sensors 102 (U, V, and W) at logic high (HHH state) indicates that one of the sensors 102 is stuck high.

FIG. 2 is a diagram that contains sensor state patterns and encoded sensor state patterns corresponding to sensor errors according to an example embodiment of this invention. As shown in the example of FIG. 2, sensor state patterns 202 are assigned a value in FIG. 2 reference number 206 for decimal values and reference number 207 for the binary equivalent. An actuator angle sensor failure corresponding to a permanent high state is assigned a value of 245 and a permanent low state a value of 10. The assigned values of 10 and 245 need not appear in the encoder 130 sequence or the encoder 126 sequence unless there is a sensor error. So if the processors 120 and 122 detect a 10 or 245 the processors 120 and 122 may indicate a sensor failure.

FIG. 3 is a diagram that contains sensor state patterns and expected encoded sensor state patterns corresponding to a processor's normal operation according to an example embodiment of this invention. Sensor state patterns 302 corresponding to each sensor position 304 are read by each processor. The system assigns a nominal sequence of values 306 in a predefined order (54, 89, 106, 156, 163, 197) corresponding to the processor's normal operation. In this example, each decimal value reference number 306 in the sequence is equivalent to the respective 8-bit encoded sensor state pattern reference number 307.

In practice, this sequence repeats itself in a continuous loop. If a 10 or a 245 is not indicated by the actuator angle sensors 102 then each processor expects to see the predefined sequence repeated in the diagnostic time loop. Only values in the appropriate sequence are acceptable values, all other values indicate an error condition. A value other than the nominal values (54, 89, 106, 156, 163, 197) in the nominal sequence counter in a processor indicates an error in that processor. If either the main processor 120 or the sub-processor 122 sees the sequence in the defined order after an error was detected, they independently reset their counter(s).

There are three error conditions to be considered and detected by the AFS diagnostic system according to the example embodiment of the invention. The first is a malfunction of the actuator angle sensors corresponding to a permanent high state or a permanent low state for any failed sensors. The second is a malfunction of the main processor 120 and the third is a malfunction of the sub-processor 122.

In order to detect an error in the processors, a non-systematic hamming code is assigned to the three U, V, W sensor triples. This works as follows: for each U, V, W sensor triple (for example, U=L, V=L, W=L), an 8-bit binary number is assigned (for example, 10100011). The 8-bit number is chosen so that the numbers assigned to each sensor triple differ from every other assigned 8-bit number by at least 4 bits. In this example the above sequences are coded in 8 bits to ensure that they are immune to a single bit, a nibble byte, or word stuck at low or stuck at high errors. FIG. 4 is a diagram that contains hamming distances corresponding to expected encoded sensor state patterns according to an example embodiment of this invention. As shown in FIG. 4 the hamming distance 416 is measured between consecutive sensor state patterns. According to this example, the minimum hamming distance is four and the maximum hamming distance is seven. For example, the hamming distance between present value 2 and present value 3 is four because of the eight bit positions, four are different. Other non-systematic hamming codes may also be used for coding the sensor state patterns.

This encoding allows processor errors to be detected while also being robust to transient errors that are not long term system failures. This is because a transient error will only affect a single bit, a single nibble or a single byte which may transition to one or zero for a limited time, whereas a processor failure will result in the sequence not being generated correctly with the sequence containing many bit errors over an extended time. There may be errors in one or two diagnostic time loops that might have been caused due to glitches or loose wires. For a general implementation, the error detection sequence is repeated in six diagnostic time loops and transient errors may recover before the diagnostic time loops expire. If the transient errors recover before the diagnostic time loops expire, the AFS system may then return to normal functionality.

Figure 5:
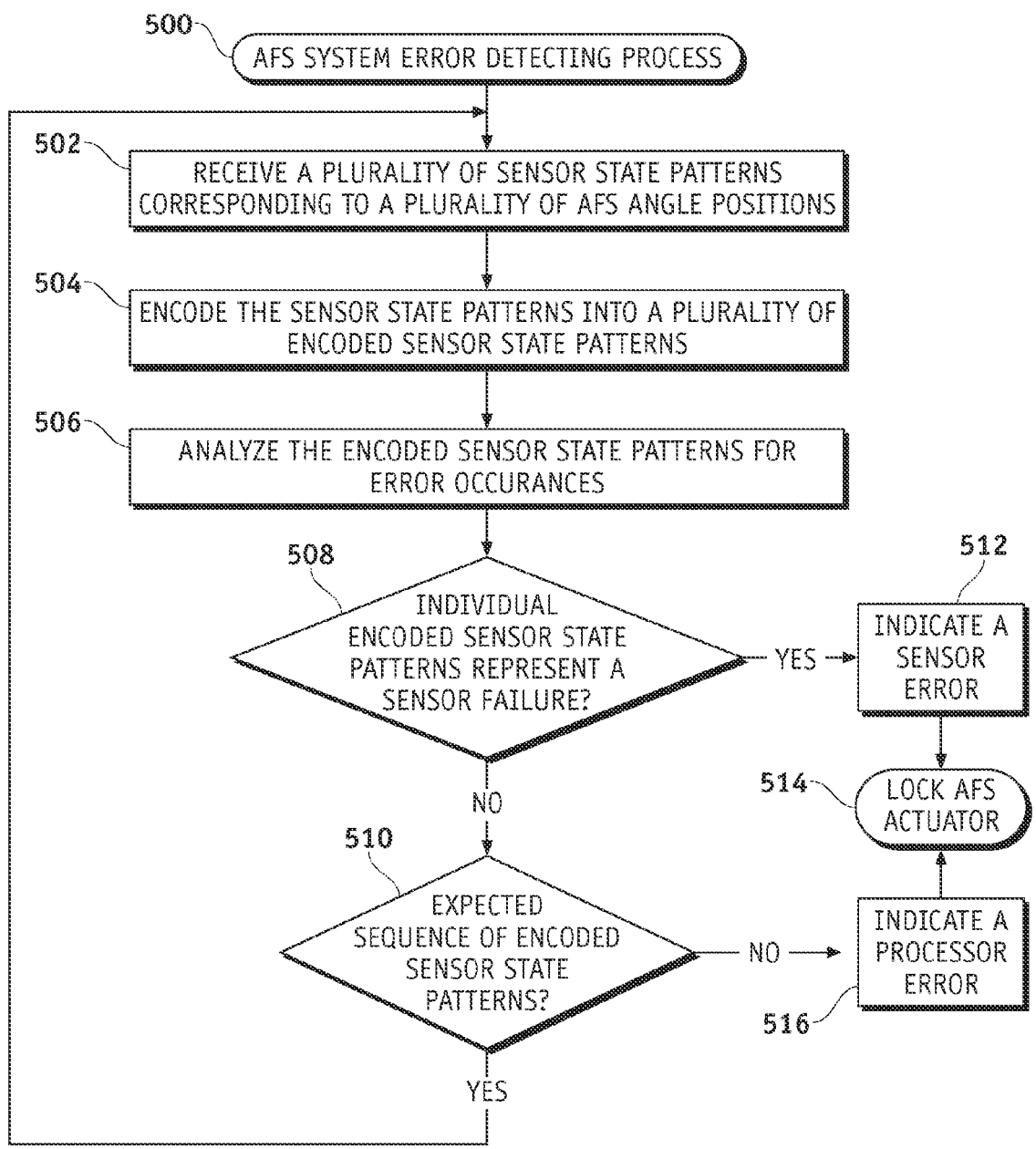
FIG. 5 is a flowchart of an AFS system error detection process according to an example embodiment of the invention.

FIG. 5 contains a flowchart of an AFS system error detection process 500 according to an example embodiment of the invention. The various tasks performed in connection with process 500 may be performed by software, hardware, firmware, or any combination thereof. For illustrative purposes, the following description of process 500 may refer to elements mentioned above in connection with FIG. 1. In practical embodiments, portions of process 500 may be performed by different elements of the described system, e.g., sensors 102, processing architecture 116, AFS actuator 104, or memory 110. It should be appreciated that process 500 may include any number of additional or alternative tasks. The tasks shown in FIG. 5 need not be performed in the illustrated order, and process 500 may be incorporated into a more comprehensive procedure or process having additional functionality not described in detail herein.

AFS error detecting process 500 may monitor the states of the sensors at each sensor position. Thus, process 500 may begin by receiving a plurality of sensor state patterns corresponding to a plurality of AFS actuator angle positions (task 502). In one example embodiment of this invention, the actuator angle position states are generated by the sensors (U, V, and W), and the states received during an iteration of task 502 represent a sensor state pattern as described above. In practice, the sensor state patterns may indicate a sensor malfunction or failure, for example, a permanent high state or a permanent low state, or they may indicate the processor's normal operation as described above.

In order to allow robust error detection, process 500 may then encode the sensor state patterns into a plurality of encoded sensor state patterns 504. For each received sensor state pattern, the encoding comprises converting the original state pattern into its corresponding encoded sensor state pattern. Each original sensor state pattern has a first number (N) of state positions and each encoded sensor state pattern has a second number (M) of state positions, where M is greater than N. In the example embodiment described herein, each original sensor state pattern has three state positions (corresponding to the U, V, W sensor output) and each encoded sensor state pattern has eight state positions (corresponding to the eight binary digits in the encoded words). For example, a non-systematic hamming code where any two of the encoded sensor state patterns have a hamming distance of at least four, as explained above, may be used to encode the original sensor state patterns for the subsequent analysis. In practice, this encoding step may be accomplished via a table lookup procedure, where each possible original sensor state pattern has a predefined encoded sensor state pattern associated therewith.

Process 500 may then analyze the encoded sensor state patterns for error occurrences. Two types of error may occur; one due to a sensor malfunction and one due to processor malfunction. To detect an error due to sensor malfunction, process 500 may analyze individual encoded sensor state patterns for error occurrences and decide whether the individual encoded sensor state patterns represent a sensor error (inquiry task 508). If a sensor error occurs, process 500 may indicate a sensor error 512 and lock the AFS actuator (task 514) accordingly. In an automotive application, process 500 may then disengage the AFS control mode and revert to a mechanical front steer mode. Process 500 may also generate a warning or a service indicator that informs the driver of a potential problem with the AFS system 100. Thereafter, AFS failure state error detecting process 500 may stop executing.

If, however a sensor error is not detected by inquiry task 508, process 500 may proceed to analyze the expected sequence of encoded sensor state patterns for occurrences of a processor error (inquiry task 510). If the expected sequence of encoded sensor patterns is detected, process 500 may lead back to task 502 for continued operation. However, if the expected sequence of encoded sensor patterns is not detected, process 500 may proceed to indicate a processor error (task 516) and then lock the AFS actuator (task 514) accordingly. As mentioned above, process 500 may then disengage the AFS control mode and revert to a mechanical front steer mode. Process 500 may also generate a warning or a service indicator that informs the driver of a potential problem with the AFS system 100. Thereafter, AFS failure state error detecting process 500 may stop executing.

Referring again to FIG. 1, for handling processor errors, each processor transmits its error indicator 124 and 128 over an internal communication link to the other processor. When an error is detected, each processor attempts to lock the actuator motor mechanically. If the main processor 120 detects an error first, it electronically locks the actuator motor followed by mechanically locking the actuator motor. If the sub-processor 122 detects an error first it sends its error indicator 128 to the main processor 120 and the main processor 120 electronically locks the actuator motor and enables the sub-processor 122 to electronically lock the actuator motor via the main processor, if the main processor is unable to lock electronically.

There are two processor malfunction cases to be considered. The first failure case is when the main processor 120 fails and the sub-processor 122 is functioning properly. The second failure case is when the main processor 120 is functioning properly and the sub-processor 122 fails.

Figure 6:
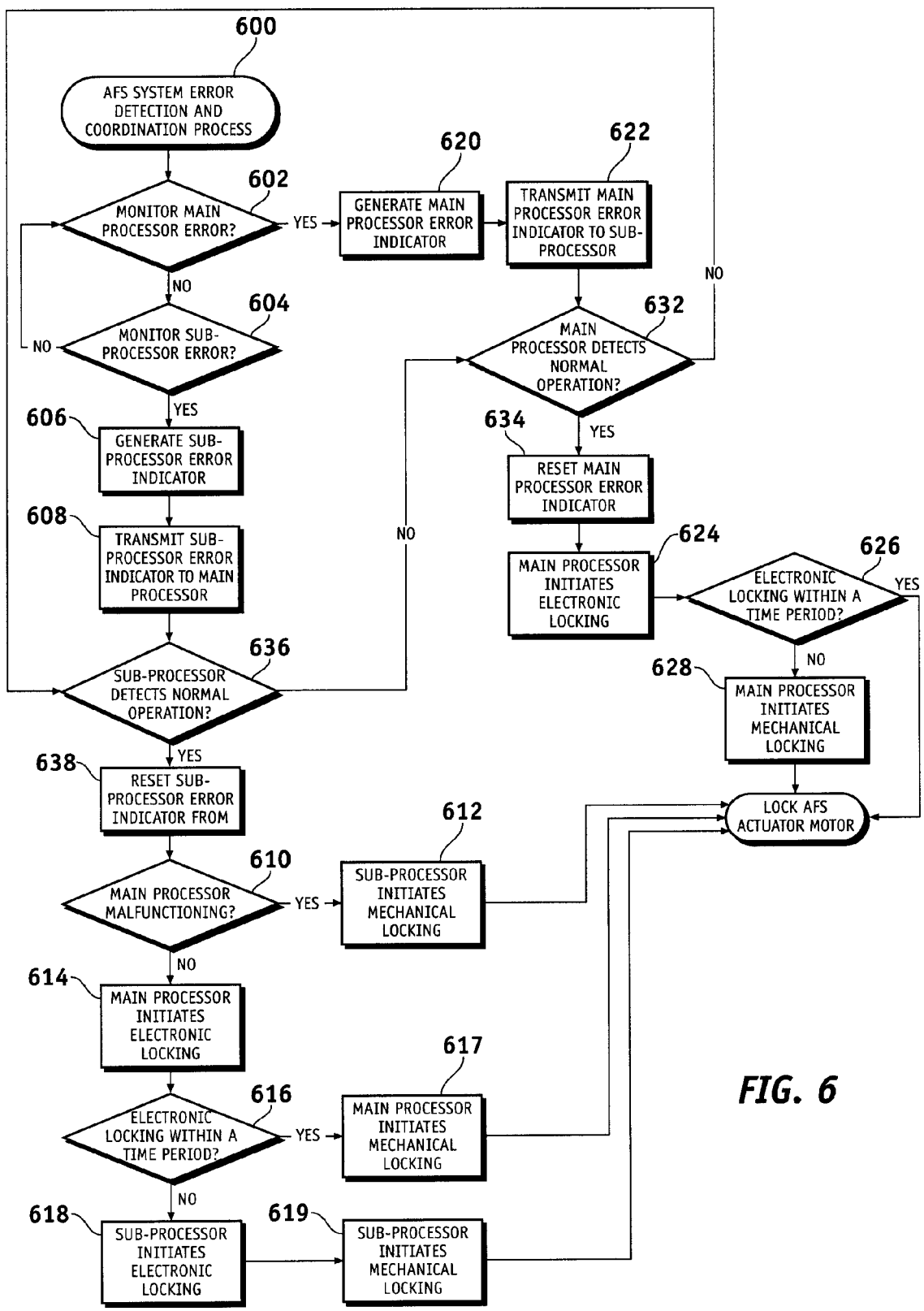
FIG. 6 is a flowchart of an AFS error detection and coordination process according to an example embodiment of the invention.

FIG. 6 is a flowchart of an AFS error detection and coordination process according to an example embodiment of the invention. The AFS error detection and coordination process 600 operates according to an example embodiment of this invention. The various tasks performed in connection with process 600 may be performed by software, hardware, firmware, or any combination thereof. For illustrative purposes, the following description of process 600 may refer to elements mentioned above in connection with FIG. 1. In practical embodiments, portions of process 600 may be performed by different elements of the described system, e.g., sensors 102, processing architecture 116, AFS actuator control 104, or memory 110. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

Process 600 may monitor the encoder sensor state patterns for occurrence of AFS system errors. In practice, the main processor and the sub-processor independently monitor for AFS system errors. Accordingly, process 600 may begin with the main processor independently monitoring the encoded sensor state patterns for errors (query task 602).

If a main processor error is not detected, process 600 may then proceed with the sub-processor independently monitoring the encoded sensor state patterns for errors (query task 604). If a sub-processor error is detected, process 600 may proceed to generate a sub-processor error indicator (task 606). Since the sub-processor may be unable to electronically lock the AFS actuator motor, process 600 may then transmit the sub-processor's error indicator to the main processor (task 608) to instruct the main processor to electronically lock the AFS actuator in response to the error detected by the sub-processor.

Sub-processor may then proceed to detect a normal operation (inquiry task 636). Normal processor operation may be defined as when the expected sequence of sensor state patterns is detected by the process 600 as explained previously. In this regard, process 600 may inquire whether the sub-processor is functioning normally (inquiry task 636) and proceed to reset the sub-processor error indicator when the main processor no longer detects the AFS system error (task 638). If the sub-processor does not detect normal operation, process 600 may then lead to inquiry task 632 to check is the main processor detects a normal operation as explained below. According to an example embodiment of this invention a processor error indicator may be set from 0 to 1 when an error occurs and may be reset from 1 to 0 when normal operation is resumed.

As mentioned previously, it is preferable to electronically lock the AFS actuator before mechanically locking the AFS actuator, regardless of which processor detects the error first. This is specifically done because the processor phase-locks the actuator motor fast enough so that when the system eventually mechanically locks the motor it does not move the lock holder back and fourth to protect the actuator parts from potential damage that may otherwise be caused by a direct mechanical locking. However, process 600 may account for processor failure cases including, without limitation, a processor malfunction where the main processor may not be able to lock the AFS actuator either electronically or mechanically. If the main processor 120 is unable to lock the AFS actuator motor because of a main processor 120 malfunction, the sub-processor 122 will mechanically lock the actuator when a time limit expires; for example less than or equal to about 36 ms. This time is less than or equal to the time to meet security metrics (for example about 42 ms) minus the time for transiting the internal communication between both processors. So process 600 proceeds to inquire whether the main processor is malfunctioning (query task 610). Mechanical locking of the AFS actuator may then be initiated by the sub-processor if the main processor is malfunctioning (task 612). If the main processor is not malfunctioning, process 600 may proceed to electronically lock the AFS actuator motor (task 614).

As mentioned previously, a processor failure may occur; for example, when the main processor's encoder 126 is not functioning properly. In this case, the sub-processor may be able to lock the AFS actuator motor electronically via the main processor. This is done because the processor electrically phase-locks the motor fast enough so that when the system eventually mechanically locks the motor it does not move the lock holder back and forth potentially causing damage. In this case the sub-processor 122 electronically locks the actuator motor through the main processor 120. The sub-processor 122 does mechanical locking independently of the main processor. In this regard, process 600 inquires to check whether the main processor has electronically locked the AFS actuator motor within a time period (task 616). If the main processor has completed the electronic locking within the time period, process 600 may proceed to initiate mechanical locking by the main processor (task 617). Otherwise, the sub-processor may initiate electronic locking via the main processor (task 618) and proceed to mechanically lock the AFS actuator motor (task 619) independently of the sub-processor.

However, if a main processor error is detected at inquiry task 602, process 600 may proceed to generate a main processor error indicator (task 620) and proceed to transmit the main processor's error indicator to the second processor (task 622) so the sub-processor can initiate mechanical locking of the AFS actuator to prepare for a failure case when the main processor may be malfunctioning and may be unable to electronically lock the AFS actuator.

Main processor may then proceed to detect a normal operation, as explained above. Thus, process 600 may inquire whether the main processor is functioning normally (inquiry task 632) and proceed to reset the main processor error indicator when the main processor no longer detects the AFS system error (task 634). If the main processor does not detect normal operation, process 600 may then lead back to inquiry task 636 as explained above.

After resetting the main processor error indicator to the normal operation (task 634), process 600 may then continue to initiate electronic locking of the AFS actuator by the main processor (task 624). The main processor 120 may electronically lock the AFS actuator motor immediately, and mechanically lock the AFS actuator motor after a time period to meet security metrics; for example, less than or equal to about 42 ms. So process 600 may inquire to check whether the main processor has electronically locked the AFS actuator motor within the time period (task 626). If the main processor has not completed the electronic locking of the AFS actuator motor within the time period, process 600 may proceed to initiate mechanical locking of the AFS actuator motor by the main processor (task 628).

An AFS diagnostic process according to an example embodiment of this invention provides a way for an AFS system to lock the AFS actuator motor electronically by a sub-processor via a main processor when an error occurs by providing an error coordination methodology between the sub-processor and the main processor. When the main processor is unable to lock the actuator electronically, the sub-processor may electronically lock the actuator via the main processor before the sub-processor mechanically locks the actuator. The electronic locking allows the AFS system to transition to mechanical locking smoothly and prevent potential damage to the AFS actuator parts that may otherwise be caused by a direct mechanical locking. The method includes a robust diagnostic technique that reduces errors due to false failures by converting the sensor state patterns into encoded sensor state patterns that have a higher bit resolution than the sensor state patterns and may be insensitive to a single bit, nibble or other errors that may have lower bit resolution than the encoder sensor state patterns according to an example embodiment of this invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for detecting errors in a vehicle active front steer (AFS) system having an AFS actuator and a plurality of sensors configured to generate sensor state patterns corresponding to different AFS actuator angle positions, the method comprising:
receiving a plurality of sensor state patterns corresponding to a plurality of AFS actuator angle positions;
encoding the sensor state patterns into a plurality of encoded sensor state patterns;
analyzing the encoded sensor state patterns for error occurrences; and
locking the AFS actuator if the analyzing step detects an error.

2. A method according to claim 1, wherein:
for each sensor state pattern, the encoding of the sensor state patterns comprises converting an original state pattern having a first number (N) of state positions into a corresponding encoded sensor state pattern having a second number (M) of state positions; and M is greater than N.

3. A method according to claim 2, wherein the converting step is performed such that any two of the encoded sensor state sequences have a hamming distance of at least four.

4. A method according to claim 1, wherein a predefined encoded sensor state sequence represents normal processor operation.

5. A method according to claim 1, further comprising analyzing individual encoded sensor state patterns for occurrence of a sensor error.

6. A method according to claim 5, further comprising indicating a sensor error if at least one individual encoded sensor state pattern representing a sensor failure is detected.

7. A method according to claim 1, further comprising analyzing a sequence of encoded sensor state patterns for occurrence of a processor error.

8. A method according to claim 7, further comprising indicating the processor error if an expected sequence of encoded sensor state patterns is not detected.

9. A method for detecting errors in a vehicle active front steer (AFS) system having an AFS actuator, a plurality of AFS actuator angle sensors configured to generate sensor state patterns corresponding to different AFS actuator angle positions, a main processor, and a sub-processor, the method comprising:

receiving a plurality of sensor state patterns corresponding to a plurality of AFS actuator angle positions;

encoding the sensor state patterns into a plurality of encoded sensor state patterns;

the main processor independently monitoring the encoded sensor state patterns for errors;

the sub-processor independently monitoring the encoded sensor state patterns for errors;

the sub-processor instructing the main processor to electronically lock the AFS actuator in response to an error detected by the sub-processor; and the main processor initiating electronic locking of the AFS actuator in response to the instructing step.

10. A method according to claim 9, further comprising mechanical locking of the AFS actuator by the sub-processor if the main processor is malfunctioning.

11. A method according to claim 9, further comprising:

the sub-processor transmitting a sub-processor error indicator to the main processor; and electronic locking of the AFS actuator in response to the sub-processor error indicator.

12. A method according to claim 9, wherein:

for each sensor state pattern, the encoding of the sensor state patterns comprises converting an original state pattern having a first number (N) of state positions into a corresponding encoded sensor state pattern having a second number (M) of state positions; and M is greater than N.

13. A method according to claim 9, wherein the converting step is performed such that any two of the encoded sensor state patterns have a hamming distance of at least four.

14. A method for detecting errors in a vehicle active front steer (AFS) system having an AFS actuator and sensors configured to generate three-bit sensor state patterns corresponding to different AFS actuator angle positions, the method comprising:

receiving, from the sensors, a plurality of three-bit sensor state patterns corresponding to a plurality of AFS actuator angle positions;

encoding each of the three-bit sensor state patterns into a corresponding encoded eight-bit sensor state pattern, resulting in a plurality of encoded eight-bit sensor state patterns, wherein the encoding is performed such that any two of the encoded eight-bit sensor state patterns have a hamming distance of at least four bits;

analyzing the encoded eight-bit sensor state patterns for error occurrences; and locking the AFS actuator if the analyzing step detects an error.

* * * * *